United States Patent
Hosoya et al.

(10) Patent No.: US 7,493,036 B2
(45) Date of Patent: Feb. 17, 2009

(54) IMAGING DEVICE

(75) Inventors: Naoto Hosoya, Kanagawa (JP);
Keikaku Fukuoka, Kanagawa (JP)

(73) Assignee: Sony Corporation (JP)

( * ) Notice: Subject to any disclaimer, the term of this patent is extended or adjusted under 35 U.S.C. 154(b) by 313 days.

(21) Appl. No.: 11/441,107

(22) Filed: May 26, 2006

(65) Prior Publication Data

US 2006/0291846 A1    Dec. 28, 2006

(30) Foreign Application Priority Data

Jun. 24, 2005    (JP)    ............................. 2005-185600

(51) Int. Cl.
*G03B 13/36*    (2006.01)
(52) U.S. Cl. ...................... 396/123; 396/104
(58) Field of Classification Search ................ 396/121, 396/123, 89, 48, 461, 102, 103, 125, 104, 396/101, 135; 348/354, 355
See application file for complete search history.

(56) References Cited

U.S. PATENT DOCUMENTS

| | | | |
|---|---|---|---|
| 4,630,296 A * | 12/1986 | Haaker et al. .................. 378/2 |
| 5,166,722 A * | 11/1992 | Kusaka ........................ 396/54 |
| 5,208,625 A * | 5/1993 | Suekane ....................... 396/95 |
| 5,568,598 A * | 10/1996 | Mack et al. .................. 345/639 |
| 5,842,059 A * | 11/1998 | Suda ........................... 396/101 |
| 2004/0090551 A1* | 5/2004 | Yata ............................ 348/354 |
| 2006/0038894 A1* | 2/2006 | Chan et al. ............... 348/222.1 |

FOREIGN PATENT DOCUMENTS

JP    2004-274619    9/2004

* cited by examiner

*Primary Examiner*—Reena Aurora
(74) *Attorney, Agent, or Firm*—Rader Fishman & Grauer PLLC; Ronald P. Kananen

(57) ABSTRACT

There is provided an imaging apparatus which includes image acquiring means for acquiring an image of an object; storing means for temporarily storing an image acquired by the image acquiring means; and control means for detecting a portion having changed upon comparison of a first image and a second image which are stored in the storing means, each image acquired by the image acquiring means at a different time, and to focus on the portion having changed.

9 Claims, 5 Drawing Sheets

IMAGING DEVICE

CROSS REFERENCES TO RELATED APPLICATIONS

The present document contains subject matter related to Japanese Patent Application JP 2005-185600 filed in the Japanese Patent Office on Jun. 24, 2005, the entire contents of which are incorporated herein by reference.

BACKGROUND OF THE INVENTION

1. Field of the Invention

The present invention relates to an imaging apparatus for imaging an object, and, that in particular, it relates to a technology for ensuring that a desired object is automatically focused in.

2. Description of Related Art

When capturing an image of an object with an imaging apparatus, focusing of the object is actuated by pressing a shutter release button. However, in a case of using a so-called self timer function, which automatically starts capturing an image after a preset time elapses, there occurs a problem that when the timer starts counting by pressing the shutter release button before an object is set, a background scene is focused without the presence of the object to be photographed.

Further, even in a case of imaging an object with its focus fixed at a preset distance, it is not easy to secure the object to be positioned exactly at the preset distance.

Therefore, as disclosed, for example, in Japanese Patent Application Publication No. 2004-274619, a technology to illuminate an object with an auxiliary light when the self timer is activated and to measure a distance at which it is to be focused in is proposed.

However, according to the technology described in the above related art, there was a disadvantage that because of a difficulty in specifying an object which is to be focused in, it is likely that the focus is set at a background scenic spot or the like behind the object instead thereof.

SUMMARY OF THE INVENTION

The present invention has been contemplated in order to solve the above-mentioned problem associated with the related art, and to provide an imaging apparatus capable of focusing a target object to be photographed.

In order to solve the above-mentioned problem, an imaging apparatus according to the present invention includes image acquiring means for acquiring an image of an object, a memory for temporarily storing an image acquired by the image acquisition unit, and control means for detecting a portion that has changed between a first image and a second image that have been acquired at a different time with the image acquiring means upon comparison therebetween, and ensuring that the portion changed is focused in.

According to the present invention, because of a feature that, by comparing the first image and the second image which have been acquired at different times and by detecting a portion changed therebetween, focusing in the changed portion is achieved, it becomes possible to obtain a complete image in which a target object is accurately focused even if it is automatically photographed in a timer function mode.

DESCRIPTION OF THE EMBODIMENT

Figure 1:
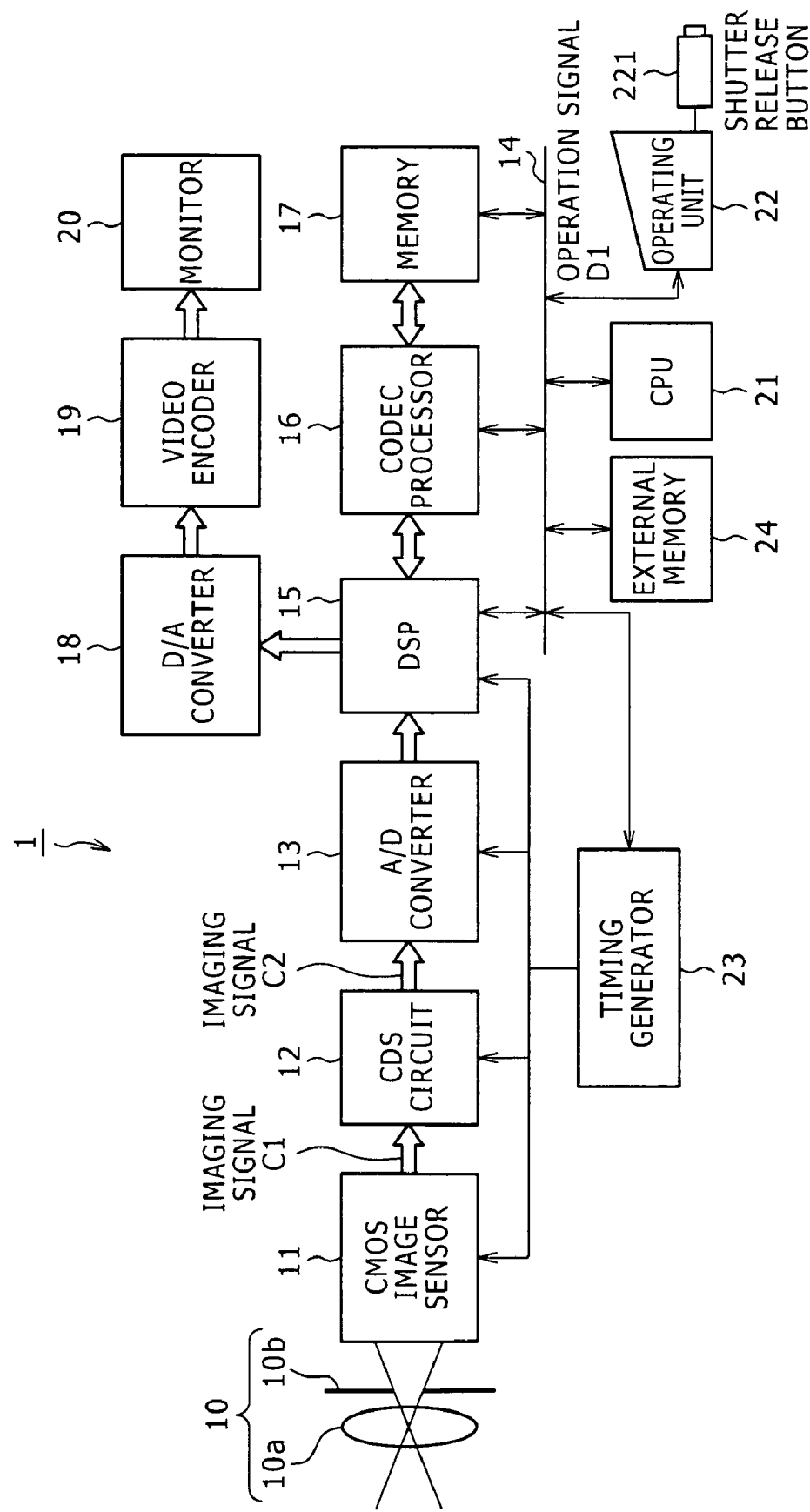
FIG. 1 is a block diagram showing a configuration of an imaging apparatus according to an embodiment of the invention.

In the following, a preferred embodiment of the present invention will be described specifically by referring to the accompanying drawings. The present invention will be applicable to an imaging apparatus 1, for example, as shown in FIG. 1. This imaging apparatus 1 is provided with an imaging unit 10 for imaging an object. The imaging unit 10 includes a lens 10a for forming an image from image light of the object, a diaphragm drive unit 10b for adjusting an aperture volume with a shutter blade or the like, which is not shown, by shielding image light incident via the lens 10a and a Complementary Metal-Oxide Semiconductor (CMOS) image sensor 11 for producing an electric imaging signal C1 on the basis of the image of an object inputted. In the description of the embodiment of the present invention, although the use of CMOS image sensor 11 is referred to, it is not limited thereto, and a Charge Coupled Device (CCD) image sensor may be used as well.

The imaging apparatus 1 is provided with a Correlated Double Sampling (CDS) circuit 12, an A/D converter 13, a digital signal processor (DSP) 15, a CODEC processor 16 and a memory 17. The CDS circuit 12 compensates variation in the imaging signal C1 produced by the CMOS image sensor 11. The A/D converter 13 is for analog/digital conversion processing of an imaging signal C2 supplied from the CDS circuit 12. The DSP 15 temporarily stores image data, as the digitalized imaging signal C2, supplied from the A/D converter 13 and applies a predetermined processing thereto. The CODEC processor 16 encodes the image data supplied from the DSP 15 connected thereto. The memory 17 stores image data supplied from the CODEC processor 16.

The imaging apparatus 1 is further provided with a D/A converter 18 for digital/analog conversion processing of the image data supplied from the DSP 15, a video encoder 19 for converting the image data from the D/A converter 18 to a video signal, and a monitor 20 connected to the video encoder 19 for displaying an image in response to the video signal to the user. Still further, the imaging apparatus 1 includes a CPU (Central Processing Unit) 21, an operating unit 22 and a timing generator 23. The CPU 21 controls the whole units of the imaging apparatus 1 connected thereto via an internal bus 14. The operating unit 22 is connected to the internal bus 14 for allowing the user to execute various operations. The timing generator 23 controls a signal processing system including elements from the CMOS image sensor 11 to the DSP 15 in response to a control signal sent from the CPU 21 via the internal bus 14.

The imaging unit 10 executes an automatic diaphragm control operation, an automatic focus control operation and the like in response to an operation signal supplied from the CPU 21. Also, in response to an aperture value inputted through the operating unit 22, a quantity of the aperture is controlled by closing a shutter blade which is not shown.

The CMOS image sensor 11 produces an imaging signal C1 by converting an object image inputted via the lens 10a and the diaphragm drive unit 10b to an electric signal, and outputs it to the CDS circuit 12. By way of example, the CMOS image sensor 11 is able to select a portion of a region in an object image formed on an imaging plane, and efficiently read out pixel values only in the region thus selected.

The CDS circuit 12 eliminates noise in the imaging signal C1 supplied from the CMOS image sensor 11 by use of a correlated double sampling circuit, or applies a gain amplification processing, and outputs an imaging signal C2 to the A/D converter 13. The A/D converter 13 executes an analog/digital conversion processing of the imaging signal C2 supplied from the CDS circuit 12, and outputs it to the DSP 15. By way of example, each operation timing in this CDS circuit 12 and A/D converter 13 is controlled by means of the timing generator 23 so as to continue image capturing at a constant frame rate.

The DSP 15 is a block including a signal processing processor and an image RAM, both of which are not shown here. An image indicated as the image signal C2 from the A/D converter 13 is supplied as a data stream composed at a constant frame rate under the control of the timing generator 23, and is stored temporarily in the image RAM. The signal processing processor is set to apply a preprogrammed image processing to the image stored in the image RAM. An image applied the image processing in this image RAM is sent to either or both of the CODEC processor 16 and the D/A converter 18.

The CODEC processor 16 applies a data compression in a predetermined format to the data sent from the DSP 15. Here, it may be set to apply compression coding in compliance with a standard such as Joint Photographic Expert Group (JPEG) or the like.

The memory 17 is a medium for storing image data having been applied compression processing in the CODEC processor 16 at an appropriate address thereof. This memory 17 is provided for temporarily storing image data for the use of image comparison.

The monitor 20 displays images that have been converted to analog signals in the D/A converter 18 and video signals in the video encoder 19. The monitor 20 may be composed of liquid crystal display elements or the like mounted on the side surface of a housing of the imaging apparatus 1 so that the user can confirm imaging contents in real time by himself/herself while executing imaging processes.

The CPU 21, to which a ROM which stores control programs to be executed and a DRAM which functions as a work area for data accumulation, deployment and the like are connected via the internal bus 14, has a function to serve as a central arithmetic unit for controlling the entire portion of the imaging apparatus 1. The CPU 21, in response to an operating signal D1 supplied from the operating unit 22, produces an operation signal, and sends it to the imaging unit 10 via the internal bus 14.

The operating unit 22 is composed of input keys and the like for enabling the user to freely adjust an imaging angle and an imaging direction or to freely set an aperture value and an exposure time. This operating unit 22 produces an operating signal D1 in response to information inputted by the user and sends the operating signal D1 to the CPU 21 via the internal bus 14. Further, this operating unit 22 has a shutter release button 221, and in response to a depression operation of the shutter release button 221 by the user, produces an operating signal D1 instructing the start or stop of image capturing, and then this operating signal D1 is sent to the CPU 21 via the internal bus 14. In addition, the operating unit 22 is provided with a mode switch button, which is not shown, for switching to a so-called self-timer mode, thereby enabling the start of an imaging operation after a preset time elapses.

An external memory 24 is composed, for example, of a semiconductor memory, a magnetic recording medium, a photo-electromagnetic recording medium or the like. By providing this external memory 24 as a removable recording medium, it is able to transfer the images thus captured to another personal computer or the like for viewing or executing various search and processing therein.

An image of the object captured by the imaging apparatus 1 having the above-mentioned configuration becomes the imaging signal C1 after conversion processing to an electric signal in the CMOS image sensor 11, and becomes the imaging signal C2 after noise elimination processing in the CDS circuit 12, which is then given an analog-to-digital conversion processing in the A/D converter 13. Further, the image indicated as the imaging signal C2, after having been stored in an image RAM in the DSP 15, which is not shown, and subjected to a predetermined image processing, receives a digital-to-analog conversion processing in the D/A converter 18 for displaying on the monitor 20, or alternatively, is encoded in the CODEC processor 16 to be recorded in the memory 17.

Figure 2:
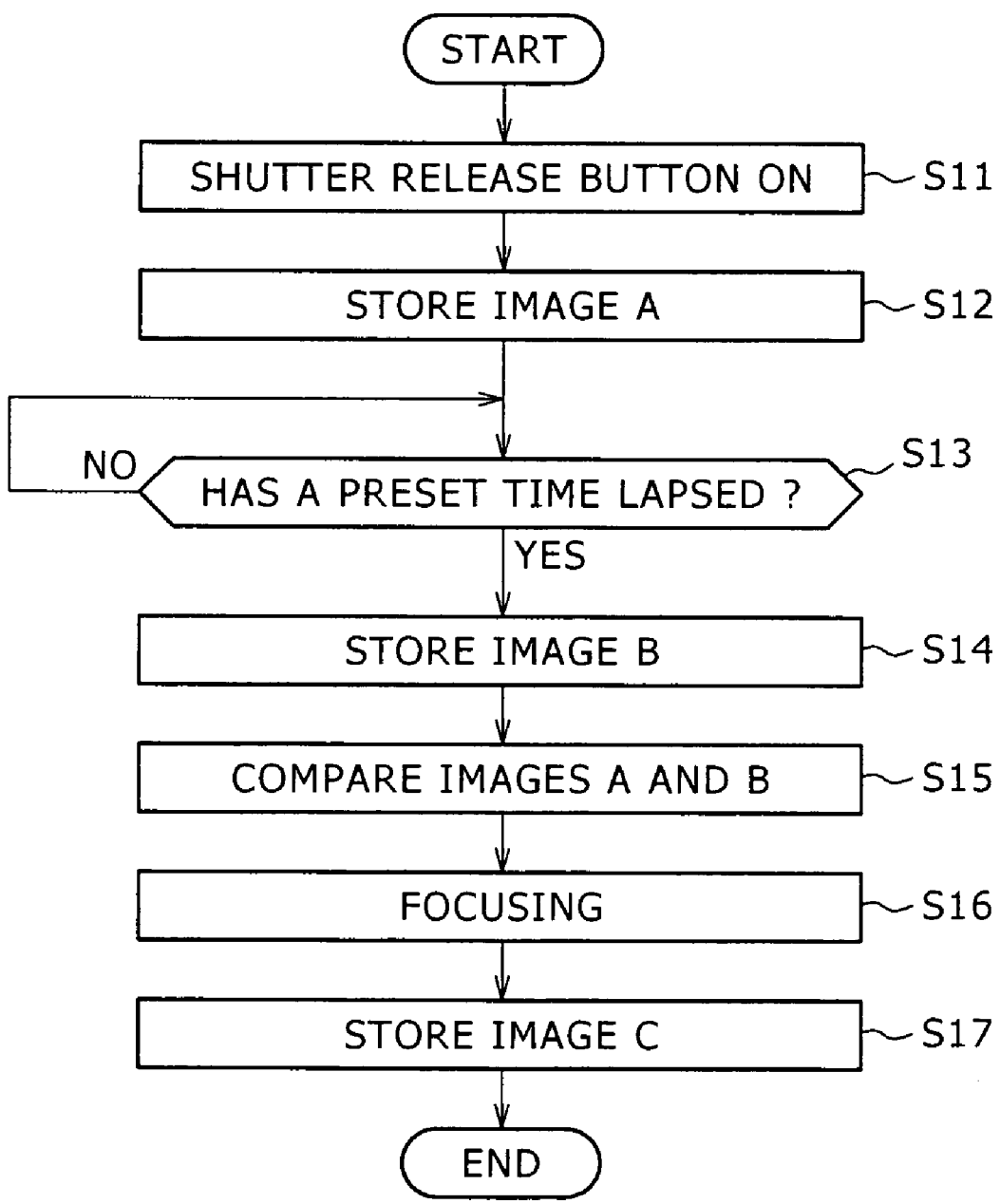
FIG. 2 is a flowchart showing steps of imaging operations according to the embodiment of the invention.
Figure 3:
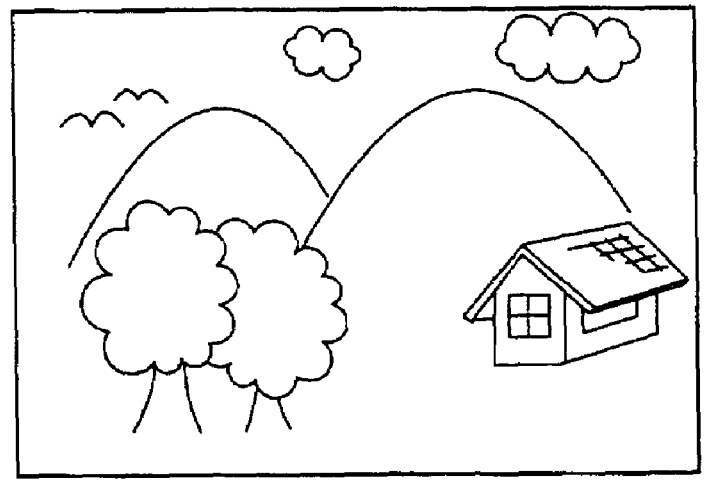
FIG. 3 is a diagram showing an example of an image A.

Subsequently, operations of the imaging apparatus according to the embodiment of the present invention will be described by referring to FIGS. 2 and 3. The description here will be made by assuming a case where the photographer takes a shot of one's own portrait by use of a so-called self-timer function which automatically starts imaging after a preset time elapses. However, the present invention is not limited thereto.

First of all, the user selects a self-timer mode with a mode switch button mounted on the operating unit 22, which is not shown. Using this self-timer mode, it is possible to capture an image of a scene surrounding the photographer as well as his/her own portrait.

The photographer decides an appropriate imaging angle so that a desired scene fits within an image. Then, by pressing a shutter release button 221, the self-timer of the imaging apparatus 1 starts countdown.

Figure 4:
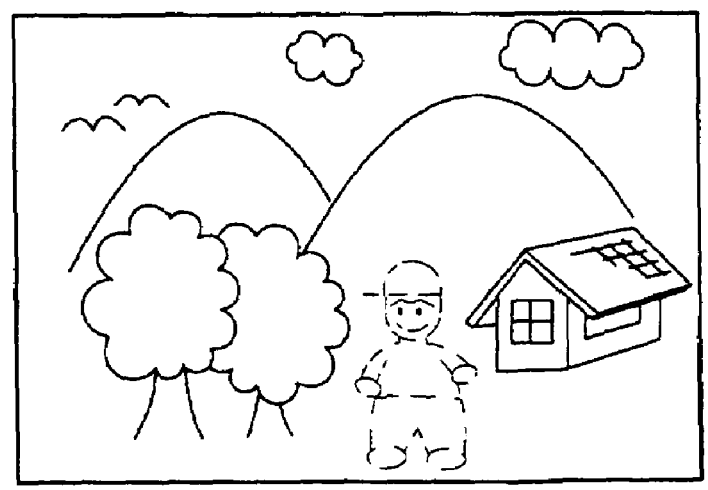
FIG. 4 is a diagram showing an example of an image B.

When the shutter release button 221 is pressed (Step 11), the CPU 21 stores an image A obtained via the CMOS image sensor 11 into the memory 17 (Step 12). As shown in FIG. 3, the photographer who is a target object is not in the image A. After a predetermined time has elapsed (Step 13), the CPU 21 obtains an image B to be stored in the memory 17 (Step 14). During this preset time interval, the photographer moves into a desired position within the image angle decided by the photographer himself/herself. Therefore, the image B stored in the memory 17 will be one, for example, such as shown in FIG. 4, with the photographer being within the background of FIG. 3.

In Step 15, the image A stored in Step 12 and the image B stored in Step 14 are compared. This comparison is executed on the basis of pixel values taking, for example, from 0 to 255 values in dependence on brightness, and pixels having a difference equal to or greater than a predetermined threshold value are detected, thereby defining a changed portion.

Figure 5:
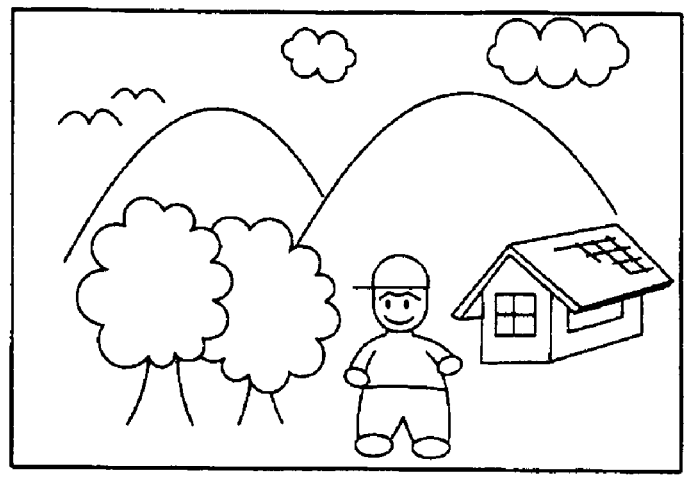
FIG. 5 is a diagram showing an example of an image C.

In Step 16, based on the comparison in Step 15, an object in a region where a change has occurred is focused in. This focusing is performed by the imaging unit 10 in accordance with an operation signal from the CPU 21. When the object therein is focused in, the shutter is released, and the CPU 21 causes this image C thus obtained to be stored in an external memory 24 (Step 17). Further, when capturing this image C, it is notified that the photographer who is the object is focused in. The image C will be one such as shown in FIG. 5, in which the photographer, the object, is focused in more accurately than in the image B.

As described above, through comparison of the images A and B taken at a different time and focusing on a portion where the change occurred, as it becomes possible to designate a target object, a desired image accurately focused in can be obtained.

By way of example, it is desirable for the time at which the image B is acquired in Step 14 to be decided on the basis of settings in the self-timer which starts counting in Step 11. That is to say, the preset time in Step 13 is desirable to be decided in accordance with a set time in the self-timer. For example, if the image B is acquired immediately before the end of the self-timer count, and compared with the image A, it is able to achieve focus-in immediately before the end of the self-timer count upon which the shutter button is released, thereby enabling a clear image free of blur, even for a moving object, to be obtained.

Further, in Step 15, it may be arranged so that if no changed portion is detected as a result of the comparison between the images A and B which were taken at a different time, another image is captured and stored once again after a while within the preset time, and this step may be repeated until a change occurs between these images compared.

Still further, it may be arranged so that if no change occurs within the time set by the self-timer, i.e., no change occurs within the time from when the self-timer shutter release button 221 was pressed until when the shutter button is actually released, an image is captured as focused on the image A stored in Step 12, and the photographer is notified of this.

Furthermore, it may be arranged so that if changes occurred in a plurality of regions as a result of the comparison between the images A and B which were captured at different times, a portion having a change in a largest region is focused in.

Figure 6:
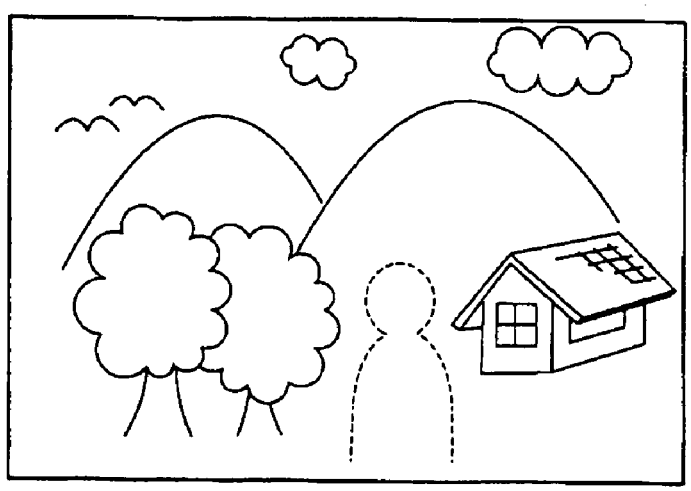
FIG. 6 is a diagram showing an example of an image in which a region to be compared is designated.

Still furthermore, it may be arranged so that by prescribing a region to be compared in advance, those images A and B corresponding to this region are compared. For example, through operation of the operating unit 22, the photographer may input and designate this region for comparison, as shown in FIG. 6. The imaging unit 1, while storing the position of a mark (indicated in dotted lines) set up by the photographer in the memory 17, executes the above-mentioned steps of operation. In this case, a comparison of the images A and B in Step 15 may be done only within an indicated marked region. Here, when a target object enters the prescribed marked region, that is, when a change is detected in the marked region as a result of comparison of the images A and B, the imaging apparatus 1 may inform the photographer who is the object to be captured of this fact. Thereby, the photographer is able to obtain a desired image with a desired composition in which the photographer who is the target object is accommodated as accurately focused in the indicated marked region. Also, it is possible to reduce substantially the time of computation for the detection of the changed region. Still further, inadvertent focusing on a passenger, a bird, a cloud or the like, other than a target object, can be prevented.

Figure 7:
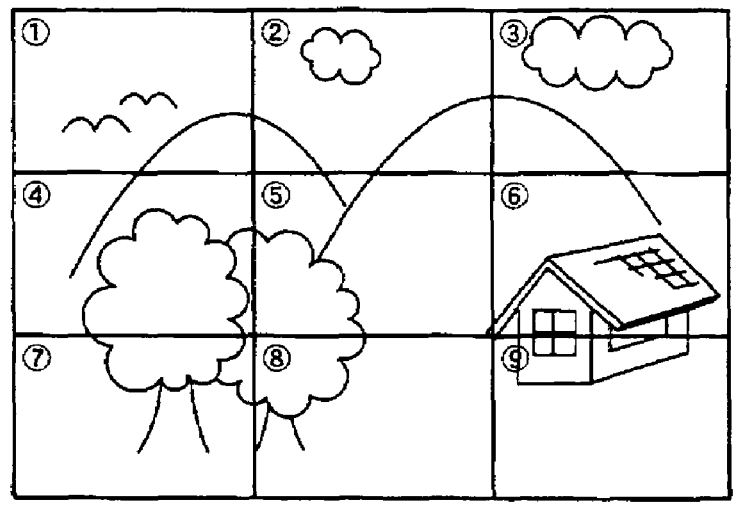
FIG. 7 is a diagram showing an example of the image A having partitioned regions to be compared.
Figure 8:
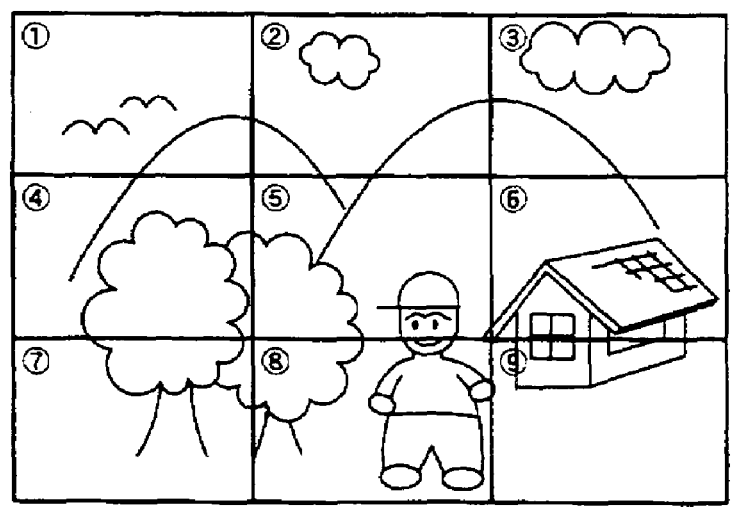
FIG. 8 is a diagram showing an example of the image B having partitioned regions to be compared.

Furthermore, it may be arranged so that the photographer is shown an image which is split in advance into a plurality of regions to be compared, as shown in FIG. 7, and from which the photographer chooses the item number of a desired region. For example, in a case where regions Nos. 5 and 8 are selected, only portions changed in regions Nos. 5 and 8 may be compared, i.e., the images of FIGS. 7 and 8 can be compared more efficiently by limiting the comparison selected to the regions Nos. 5 and 8. Then, it is ensured that an object existing in a changed portion of these regions Nos. 5 and 8 in the image of FIG. 8 will be focused in.

Still furthermore, in the comparison of the images A and B captured at different times, it may be arranged so as to ensure that the photographer is focused on the basis of information for identifying the photographer in accordance with facial or physical characteristics which is pre-stored. For example, for identifying the face of a photographer who is an object, the related art disclosed in JP Application Publication Nos. 2003-271958 and 2004-302644 applied by the present inventors can be utilized. Namely, upon detecting a facial image from an image captured, characteristic facial information is searched from this facial image, and then it is compared with characteristic facial information from the facial image of the photographer that is registered in advance, thereby enabling identification of an appropriate object that is to become a target. Thereby, even if imaging in the self-timer mode, it is ensured that the photographer who is a target object will be accurately focused.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   image acquiring means for acquiring an image of an object;
   storing means for temporarily storing an image acquired by said image acquiring means; and
   control means for detecting a portion having changed, upon comparison of a first image and a second image which are stored in said storing means, each image acquired by said image acquiring means at a different time, and focusing on the portion having changed.

2. An imaging apparatus as claimed in claim 1, further comprising:
   input means for designating a region to be compared between the first image and the second image by means of said control means, wherein said control means detects a portion having changed within the region designated.

3. An imaging apparatus as claimed in claim 1, further comprising input means for selecting a region which is used for comparing the first image and the second image, wherein said control means detects a portion having changed within the region selected by said input means.

4. An imaging apparatus as claimed in claim 1, further comprising recognizing means for recognizing an object, wherein said control means focuses on an object in the second image recognized by said recognizing means.

5. An imaging apparatus as claimed in claim 1, further comprising:
   an input means for designating a detection region, the detection region being a region limiting the area in the first and second image in which the control compares the first image and the second image for change to identify the portion of the second image which changed relative to the first image.

6. An imaging apparatus as claimed in claim 1, further comprising an input means for selecting a comparison region comprising at least one cell on a grid representing an area in the first and second images, the comparison region limiting the area in the first and second image in which the control compares the first image and the second image for change to identify the portion of the second image which changed relative to the first image.

7. An imaging apparatus as claimed in claim 1, further comprising a recognizing means for recognizing an object, wherein said control means focuses on the object in the second image recognized by said recognizing means.

8. An imaging apparatus comprising:
- an image acquiring unit for acquiring an image of an object;
- a memory for temporarily storing an image acquired by said image acquiring unit; and
- a controller for detecting a portion having changed, upon comparison of a first image and a second image which are stored in said memory, each image acquired by said image acquiring unit at a different time, and focusing on the portion having changed.

9. An imaging apparatus comprising:
- an image acquiring means for acquiring a first image and a second image of a scene at different times;
- a storing means for temporarily storing the first image and second image; and
- a control means for detecting a portion of the scene which has changed by determining a portion of the second image which changed relative to the first image, and for adjusting the focus by analyzing the portion of the scene which changed, the detecting being performed based on a comparison of the scene based on the first image and the second image.

* * * * *